Dec. 17, 1963     W. F. DUNN     3,114,560
REINFORCED CLOSURE FOR A LUBRICANT CHAMBER
Filed Feb. 18, 1959
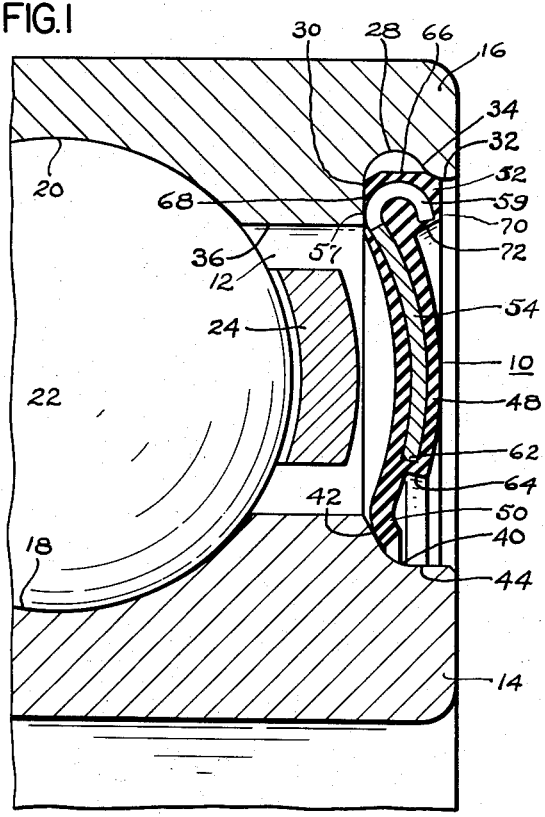
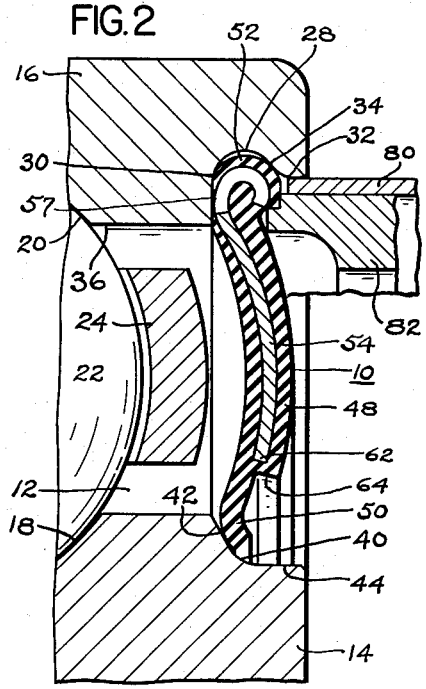
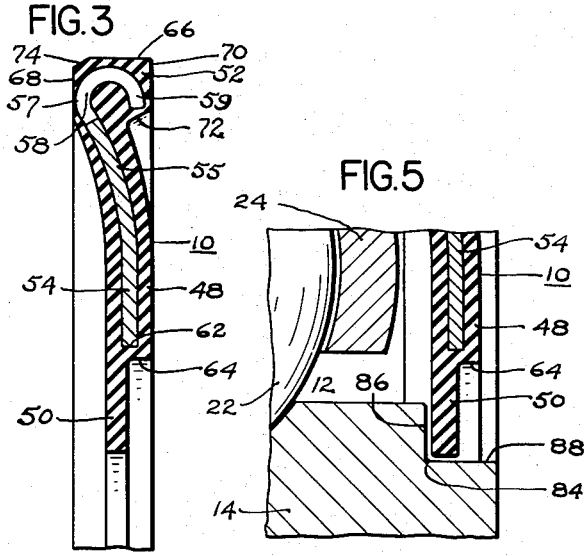
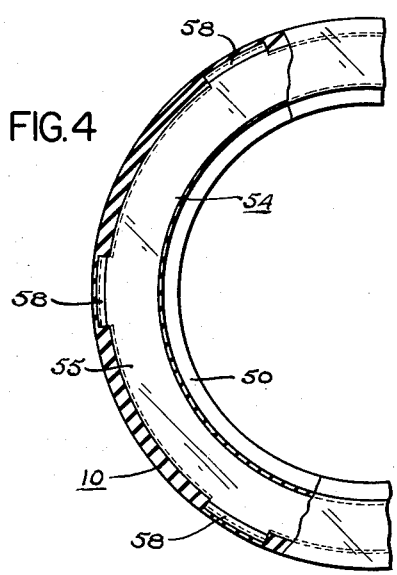
INVENTOR.
WALLACE F. DUNN
BY Edward H. Goodrich
HIS ATTORNEY United States Patent Office 3,114,560
Patented Dec. 17, 1963

3,114,560
REINFORCED CLOSURE FOR A LUBRICANT CHAMBER
Wallace F. Dunn, Bristol, Conn., assignor to General Motors Corporation, Detroit, Mich., a corporation of Delaware
Filed Feb. 18, 1959, Ser. No. 794,098
3 Claims. (Cl. 277—94)

This invention relates to a closure for closing an end of the annular space between a pair of relatively rotatable members and particularly to the mounting of a seal across the end of the annular lubricant chamber between a pair of relatively rotatable antifriction bearing members to retain lubricant within the bearing and prevent the entrance of water and other deleterious materials into the bearing.

It is generally recognized that a precision antifriction bearing such as a ball bearing when operated at high speeds, should not be flooded with lubricant but should be operated in the presence of only a small measured amount of lubricant which is free to circulate throughout the bearing. An excess of lubricant impedes the movements of the rolling elements and causes detrimental heating of the bearing which usually results in much shortened bearing life. Hence, it is usual during manufacture of such a bearing to supply it with this small amount of carefully measured lubricant and to close the ends of the bearing with seals which retain this lubricant within the bearing and prevent the entrance of objectionable materials into the bearing. Heretofore, seals at the ends of antifriction bearings have often been cumbersome expensive installations that produced objectionable frictional drag which retarded the bearing operation and caused injurious heating of the bearings. Furthermore, many of the previously used seal constructions have included metal shields or holders which were laterally folded over into tightly wedged relation within a mounting groove in one of the race rings of such a bearing with the result that objectionable expansive forces were set up which distorted the bearing and spoiled its previously ground precise contours. Also, there have been cumbersome molded seal constructions which were complicated arrangements that in many instances had to be held in position by metal rings which were difficult to install.

An object of this invention is to provide an improved arrangement for mounting a closure across the end of an annular lubricant chamber.

Another object is to provide an improved inexpensive closure of simple construction and which may be easily and quickly installed as a unit within the end of an annular space between a pair of relatively rotatable members to prevent leakage of lubricant or deleterious materials past the closure.

It is a further object of this invention to provide the improved annular yieldable closure for insertion between a pair of relatively rotatable members and which has a reinforcing member that may be deformed into cushioned mounting relation with one of the members.

A still further object of my invention is to provide an improved closure for the end of an antifriction bearing and which is sealingly and yieldably mounted in unit-handling assembly with the bearing without exerting distorting stresses on the bearing.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a fragmentary cross sectional view of an antifriction bearing provided with my improved closure in the form of a seal;

FIGURE 2 is a fragmentary cross sectional view of the bearing of FIGURE 1 and showing the manner of installing my closure;

FIGURE 3 is a cross sectional fragmentary view of my closure before insertion in the bearing;

FIGURE 4 is a fragmentary end view of my closure which is partially cut away to show the embedded reinforcing member; and FIGURE 5 is a cross sectional view of a portion of a bearing showing my closure installed in the end of a bearing in the form of a shield.

My improved closure generally indicated at 10 is shown in closing relation across the end of an annular lubricant chamber 12 between a pair of relatively rotatable inner and outer race rings 14 and 16 of a ball bearing. It will be appreciated that my closure may also be used in the same manner for closing the end of an annular lubricant chamber in a roller bearing. The race rings 14 and 16 are respectively provided with the usual raceways 18 and 20 which receive rolling elements as balls 22 guided by a separator 24 to provide for relatively coaxial artifrictional rotation between the race rings. One or both ends of one of the race rings, as the outer race ring 16, is provided with an annular seal-mounting groove 28 which is transversely curved between an annularly extending generally radial shoulder 30 and a transversely rounded annularly extending land 32 which laterally extends to the end of the race ring. The outer side wall of the groove 28 adjacent the land 32 is preferably generally frusto-conical as shown at 34. The seal mounting groove 28 radially opens towards the other race ring, as the inner race ring 14, and this groove preferably merges with the annular shoulder 30 at its inner side and merges at its outer side with the frusto-conical surface 34. The transversely curved land 32 preferably has a diameter intermediate that of the bottom of the groove 28 and that of an inner cylindrical surface 36 at one side of the raceway 20. The other race ring, as the inner race ring 14, has at its outer end an annularly extending notch 40 whose inner end is preferably shaped with a frusto-conical portion 42 and a transverse curvature that merges with a cylindrical bottom wall 44.

My reinforced sealing member 10 comprises a ring of molded resilient rubber-like material provided with an intermediate body portion 48 having its radial inner end formed as a flexible annular sealing lip 50 and having its outer radial end formed as an annularly extending resiliently deformable bead 52 arranged to deformably seat in sealing relation within the mounting groove 28. The sealing washer 10 may be formed from a suitable inherently resilient material which is rubber-like in character and which will not deteriorate or appreciably alter its resiliency in the presence of heat, light and/or bearing lubricants. One satisfactory rubber-like material which I employ for this sealing washer 10 comprises a resilient vulcanized synthetic rubber containing a polymerization product of butadiene acrylic nitrile.

The sealing washer 10 is strengthened by an embedded reinforcing disc 54 which is preferably bonded to the sealing washer 10 during the molding operation. This reinforcing disc may be stamped out from suitable sheet metal and has an annular body portion 55 which is preferably dished outwardly as shown to provide added rigidity to the seal 10 as well as to provide added space for movement of lubricant within the bearing. The outer periphery of the reinforcing disc 54 has an annularly extending wall portion 57 for locating engagement against the shoulder 30 as will be later explained. This outer periphery has circumferentially spaced radially projecting lugs or teeth 58 which are correspondingly and laterally bent over at 59 in the general shape of hooks. The diameter of the reinforcing disc 54 at the outer portions of the lugs 58 is slightly less than the diameter of the transversely curved land 32 to facilitate insertion of the seal in the mounting groove 28. The body portion 55 of the reinforcing ring 54 is embedded within the seal body portion 48 and intermediate its inner and outer annular walls which are preferably correspondingly dished in accordance with the reinforcing disc contour.

The radial inner end 62 of the reinforcing disc 54, terminates short of an annular shouldered portion 64 from which radially extends the resilient sealing lip 50 which is preferably of much less thickness than the body portion 48. The inner wall of the body portion 48 preferably merges with or provides only a very thin coating of the rubber-like material over the curved annular wall portion 57 of each tooth 58. The resiliently deformable bead 52 which is integral with the body portion 48 and which has the toothed portions 58 embedded therein, may be somewhat rectangular in cross section with a generally cylindrical wall 66 having a diameter preferably intermediate that of the bottom of the mounting groove 28 and that of land 32. The bead 52 has generally parallel inner and outer annular walls 68 and 70 and a reentrant portion 72 which merges with the body portion 48. The bead width preferably exceeds the width of the mounting groove 28. Also, this bead is preferably provided with a frusto-conical wall 74 between the walls 68 and the periphery 66.

In assembly, the bead 52 is deformably snapped past the land 32 against the shoulder 30 and across the outer portion of the groove 28. At this time, the resilient material of the bead between its periphery and the outer surfaces of the spaced teeth 58 will resiliently and deformably distort past and land 32 and thereafter yieldably wedge against the annular shoulder 30 and the frusto-conical wall 34 positioning the resilient sealing lip 50 in lightly wiping sealing engagement against the frusto-conical wall 42 of the annular notch 40. With the seal in this position, a guide sleeve 80 is piloted within the transversely curved annular land 32 and temporarily held against the outer end wall 70 of the bead 52. An annular ram 82 slidably mounted within the sleeve 80 is then forced inwardly against the bead wall 70 to further laterally and reentrantly deform the bent-over portions 59 of the teeth 58 causing them to expand radially outwardly thus forcing the walls of the resilient bead 52 into tightly mounted sealing engagement with the sides of the mounting groove. I preferably deform the toothed portion 59 to such an extent that the bead periphery does not completely bottom within the groove 28 thus eliminating dangers of objectionable expanding stresses against the outer race ring 16. With this construction, the deformed bead will snugly and sealingly seat against the frusto-conical wall 34 and the closely adjacent or merging tooth walls 57 and bead wall 68 will locate against the annular shoulder 30 thus positively locating a predetermined seal wiping position of the flexible sealing lip 50 against the frusto-conical wall 42 of the sealing notch 40. The inner diameter of the sealing lip is preferably such that the sealing lip will not bottom in the notch 40. Hence, in the event that the relatively rotatable race rings 14 and 16 are not in precise coaxial alignment, the sealing lip will still maintain its effective sealing relation against the side wall 42 of the notch. After seal installation, the members 80 and 82 are removed and used to install subsequent seals.

In the modified construction shown in FIGURE 5, the sealing washer 10 is used as a shield wherein the flexible sealing lip 50 extends into an annular notch 84 having a generally radial side wall 86 and a cylindrical bottom wall 88. With this arrangement, the sealing lip 50 locates in very close proximity to but preferably out of contact with the walls 86 and 88 thus eliminating the slight friction occasioned by a seal wiping contact. It will be appreciated, of course, that due to the resilient flexibility of the lip 50, no injury will be done to the seal or the bearing in the event of an occasional contact of this lip with the side wall of the notch.

I claim:

1. In combination with a pair of relatively rotatable bearing members having an annular lubricant chamber therebetween, an inherently resilient rubber-like sealing washer extending across the lubricant chamber, one of said bearing members having an annular groove opening towards the other bearing member, a peripherally disposed resilient bead on the washer of lesser diameter than and mounted in said groove, a reinforcing disc embedded in the washer, circumferentially spaced teeth radially projecting from the disc and embedded in said bead, each tooth being intially laterally bent-over within said bead and being further reentrantly bent over within the mounted bead to compressibly deform the bead into wedged engagement with the sides of said groove, and each tooth having a portion engaging a side wall of the groove to locate the washer in sealing position.

2. In combination with a pair of relatively rotatable bearing members having an annular lubricant chamber therebetween, an inherently resilient rubber-like sealing washer extending across an end of the lubricant chamber, one of said members having an annular groove radially opening towards the other member, an annularly extending peripheral resilient bead on said washer and deformably received in said groove, a reinforcing disc embedded in and bonded to the washer, a plurality of laterally bent-over teeth on said disc and embedded in said bead, said teeth being further bent back reentrantly within said groove to expand the bead laterally and radially into compressibly seated sealing relation against the walls of said groove, and each tooth having a portion extending from the body portion of said disc and seated against a side wall of the groove to laterally position the sealing washer.

3. In combination with a pair of relatively rotatable bearing members having an annular lubricant chamber therebetween, an inherently resilient rubber-like sealing washer extending across the lubricant chamber, one of the bearing members having an annular groove radially opening towards the other bearing member, the inner side of the groove having a substantially radial wall, the outer side of the groove terminating in a transversely rounded annular land having a diameter intermediate that of the bottom of the groove and that of the inner diameter of said radial wall, an annularly extending resilient peripheral bead on the washer and deformably received in said groove, said bead initially having a substantially cylindrical peripheral wall whose diameter is intermediate that of the bottom of the groove and of said annular land, a reinforcing disc embedded in the washer, a plurality of circumferentially spaced teeth radially extending from the reinforcing disc and embedded in said bead, each tooth being laterally bent over and having a curved inner end extending to the inner side of the bead and locating against said radial wall, and said teeth being further reentrantly bent within the groove to compressibly deform the bead into tightly seated sealing relation with the side walls of said groove while leaving the bead radially spaced from the bottom of said groove.

References Cited in the file of this patent

UNITED STATES PATENTS

| 2,355,805 | Koepp | Aug. 15, 1944 |
| 2,714,022 | Nelson | July 26, 1955 |
| 2,734,757 | Martin | Feb. 14, 1956 |
| 2,755,113 | Baumheckel | July 17, 1956 |
| 2,850,742 | Cobb | Sept. 9, 1958 |